(12) United States Patent
Jin et al.

(10) Patent No.: US 6,617,278 B1
(45) Date of Patent: *Sep. 9, 2003

(54) CATALYST SYSTEM FOR USE IN ETHYLENE POLYMERIZATION AND COPOLYMERIZATION AND PROCESS FOR PREPARING THE SAME

(75) Inventors: Maozhu Jin, Beijing (CN); Yijing Sun, Beijing (CN); Yi Wang, Beijing (CN); Rengi Peng, Beijing (CN); Baolan Zhu, Beijing (CN); Zhaowen Ma, Beijing (CN)

(73) Assignees: China Petro-Chemical Corporation, Beijing (CH); China Petro-Chemical Corporation Beijing Research Institute of Chemical Industry, Beijing (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,826

(22) Filed: Mar. 16, 1999

(30) Foreign Application Priority Data

Mar. 17, 1998 (CN) .......................................... 98101108 A

(51) Int. Cl.$^7$ .......................... B01J 31/00; B01J 37/00; C08F 4/02; C08F 4/60
(52) U.S. Cl. ...................... 502/134; 502/111; 502/121; 502/125; 502/129; 502/126
(58) Field of Search ................................ 502/103, 111, 502/115, 117, 118, 121, 125, 126, 150, 156, 162, 170, 134, 129

(56) References Cited

U.S. PATENT DOCUMENTS

| 4,784,983 | A | * | 11/1988 | Mao et al. .................. 502/111 |
| 5,488,022 | A | * | 1/1996 | Takahashi et al. .......... 502/115 |
| 5,604,170 | A | * | 2/1997 | Sano et al. ................. 502/115 |
| 6,248,685 | B1 | * | 6/2001 | Joubert et al. .............. 502/111 |

FOREIGN PATENT DOCUMENTS

| EP | 0 258 485 A1 | 9/1988 |
| EP | 0 752 431 A2 | 8/1997 |
| JP | 49-51378 | 5/1974 |
| JP | 58183708 A | 10/1983 |

OTHER PUBLICATIONS

PCT Preliminary Examination Report dated Jul. 27, 2000.
US 2001/0031694 A1, Yang et al., Oct. 18, 2001, US patent application prepublication.*

* cited by examiner

Primary Examiner—Mark L. Bell
Assistant Examiner—J. Pasterczyk
(74) Attorney, Agent, or Firm—Birch, Stewart, Kolasch & Birch, LLP

(57) ABSTRACT

The present invention provides a catalyst system and processes for preparing the system for use in ethylene polymerization and copolymerization. The catalyst system is obtained by dissolving any electron-donor activator and optionally, a metal halide adjusting agent, into a solution of magnesium halide in a solvent system consisting essentially of organic epoxy compounds and organic phosphorous compounds to form a homogeneous solution. At least one coprecipitator and a titanium halide or its derivative is then mixed to form a solid component, followed by incorporating in combination with an organic aluminum component prior to use in polymerizations. The electron donor activator is an ether or alcohol, and the coprecipitator is an organic acid, anhydride, ether, or ketone.

29 Claims, No Drawings

CATALYST SYSTEM FOR USE IN ETHYLENE POLYMERIZATION AND COPOLYMERIZATION AND PROCESS FOR PREPARING THE SAME

BACKGROUND OF THE INVENTION

The present invention relates to a catalyst system and a process of preparing the same and uses of the same in ethylene polymerization and copolymerization processes.

Great efforts have been made in increasing the activity of ethylene polymerization catalysts and improving the properties of the product polymer and the production. Since 1970's, Mitsui Petrochemical Industries, Ltd. and others have successfully developed varieties of magnesium chloride-supported Ti-Mg high active catalyst and led to a great development in the slurry polymerization technical field in world-wide. For example, JP 49-51378 discloses representative processes for ethylene polymerization and copolymerization. The catalyst used in these processes was prepared by the steps comprising mixing a grinded magnesium dichloride with ethanol in a lamp oil medium to form a $MgCl_2.6C_2H_5OH$ slurry and then adding diethyl aluminum chloride to consume most of ethanol through an esterification followed by the addition of titanium tetrachloride to obtain an Ti-Mg high active catalyst. The preparation technique of the catalyst was uncomplicated. The reaction conditions were not severe. And the operations were facilitated. However, several obvious disadvantages of this catalyst gradually appeared in the later practice. First, due to a large polarity difference between the solvents alcohols and alkanes used therein, it is difficult for the solvents to dissolve magnesium halide. In such a case, magnesium halide can not be dissolved completely to form homogeneous solution, even heated to higher temperature (e.g. above 100° C.), but only a fine-grained colloidal suspension or a swelled magnesium halide slurry was formed. So the Catalyst thus prepared appeared some defects imparted by the characteristics of magnesium halide lamellar crystal, for example, the resultant polymer particles exhibit relatively low apparent density, poor particle morphology and poor particle size distribution.

CN 8510097.2 disclosed a catalyst system for olefine polymerization and copolymerization, and the catalyst system comprises (A) titanium-containing solid catalyst component, (B) alkyl aluminum compounds, and (C) organic silicon, wherein component (A) as a solid substance is obtained by dissolving magnesium halide into organic epoxy compounds and organic phosphorus compounds to form a homogeneous solution, then mixing with titanium tetrahalide or its derivatives, and in the presence of copreciptator such as organic anhydrides, organic acids, ethers, ketones and the like to precipitate a solid followed by treating with polycarboxylic ester to cause it to be supported onto the solid, and finally treating with titanium tetrachloride and inert diluent. The mixed solvent system used in the catalyst consisting of chlorine-containing epoxy compounds, organic phosphorus compounds and toluene was used to dissolve magnesium halide in place of alcohol and alkane solvent system. Owing to the similar polarity of those components discribed above, magnesium halide can be completely dissolved at a lower temperature (e.g. 50° C.) and a homogeneous solution was formed. The defects related to the characteristics of magnesium halide lamellar crystal can be overcome, especially the apparent density, regularity and particle morphology etc. are remarkaly improved. When the catalyst system is used in propene polymerization, the catalyst system exhibits higher activity, and the resultant polymer exhibits high regularity and its particles has larger apparent denisity. However, when used in ethylene polymerization, the catalyst appears a disadvantage of low activity yet. For example, as desclosed in example 24, under the conditions of the temperature 85° C., hydrogen pressure 0.25 MPa, ethylene pressure 0.75 MPa and ethylene polymerization for 2 hours, the polymerization activity of said catalyst is 537 kg PE/g Ti (10.7 kgPE/g Cat.), and the catalyst is not sufficiently sensitive to the molecular wight modification by using hydrogen as regulator (hydrogen modification). Owing to the defects described above, it is difficult to use the catalyst in industrial-scale.

SUMMARY OF THE INVENTION

The present invention provides a catalyst system suitable for use in ethylene polymerization and copolymerization and the process of preparing the same so as to overcome the disadvantages in the prior art. The present catalyst system for use in ethylene polymerization and copolymerization is prepared by dissolving an electron-donor activator in a solution of magnesium halide in a solvent system consisting essentially of organic epoxy compounds and organic phosphorus compounds to form a homogeneous solution, and then mixing with at least one coprecipitator and a transition metal titanium halide or its derivative to form a solid component, followed by incorporating in combination with an organic aluminum component prior to use in polymerizations. The preparation procedure of the catalyst system is uncomplicated. The catalyst exhibits high activity as being used in ethylene polymerization and the resultant polymer has better particle morphology and high apparent density, and with only small amount of low molecular weight byproduct being formed.

The catalyst system of the present invention for use in ethylene polymerization or copolymerization comprises components A and B. Said component A is a titanium-containing solid catalyst component obtained by dissolving an electron-donor activator into a solution of magnesium halide in a solvent system consisting essentially of organic epoxy compounds and organic phosphorus compounds to form a homogeneous solution and then mixing with at least one coprecipitator and transition metal titanium halide or its derivative. The electron-donor activator is at least one of organic alcohols, organic ethers and/or mixtures thereof; and the coprecipitator is selected from organic anhydrides, organic acids, ethers, and/or ketones. Said component B is an organic aluminum compound. The molar ratio of Al of component B to Ti of component A is from 5 to 1000.

The present invention further provides a process for preparing the catalyst system, particularly a process for preparing component (A) of the catalyst system.

The present invention also provides a method of using the catalyst system in ethylene polymerization.

The catalyst system of the present invention for use in ethylene polymerization comprises components (A) and (B) and optionally a metal halide adjusting agent.

Component (A) is a solid prepared by the following method:

Magnesium halide is first dissolved in a solvent system consisting essentially of organic epoxy compounds and organic phosphorus compounds, followed by mixing with an electron-donor activator to form a homogeneous clear solution. Then a coprecipitator such as organic anhydrides, organic acids, ethers, ketones and the like is added into the resultant solution, followed by mixing with trasition metal titanium halide or its derivative to from precipitate. Then the precipitate solids are filtered out, followed by washing with toluene and hexane to obtain a titanium-containing solid catalyst component (A).

Component (B) is an organic aluminum compound.

A metal halide adjusting agent is optionally used during the period of preparing component (A). Said metal halide adjusting agent is selected from a halide of Bi, Zn, Pb, Ca, Hg, V, Fe, Co and Sr or a mixture thereof.

DETAILED DESCRIPTION OF THE INVENTION

1. Preparation of the magnesium halide solution

The magnesium halide solution is a homogeneous solution obtained by dissolving a magnesium halide in a solvent system consisting essentially of organic epoxy compounds and organic phosphorus compounds with or without other inert diluents, then adding an electron-donor activator to the solvent system.

Said magnesium halide of component (A) according to the present invention includes magnesium dihalide, complexes of magnesium dihalide with water or alcohol and the like, and derivatives of magnesium dihalide wherein a halogen atom is substituted by a hydrocarboxyl group or a halohydrocarboxyl group. Particularly, said magnesium dihalide is magnesium dichloride, magnesium dibromide and/or magnesium diiodide. The most preferred magnesium halied is magnesium dichloride.

The particle size of the magnesium halide used is preferred to be such that it is easily dissolved with stirring. The dissolution temperature is about 0° C.–100° C., preferably from 3° C.–80° C. Inert diluents such as hexane, heptane, octane, benzene, toluene, xylene, 1,2-dichloroethane, chlorobenzene and other hydrocarbons or halohydrocarbons can be added optionally into the solvent system; with benzene, toluene and xylene being preferred. The most preferred diluent is toluene.

Suitable organic epoxy compounds include oxides of aliphatic olefines, diolefines, halogenated aliphatic olefines, or diolefines, glycidyl ethers, inner ethers and the like having 2–8 carbon atoms. Examples of suitable organic epoxy compounds are ethylene oxide, propylene oxide, butylene oxide, butadiene oxide, butadiene dioxide, epoxy chloropropane, methylglycidyl ether, diglycidyl ether, tetrahydrofuran and the like. Ethylene oxide, propylene oxide and epoxy chloropropane are preferred, with epoxy chloropropane being the most preferred.

suitable organic phosphorus compounds include hydrocarbyl or halohydrocarbyl esters of phosphoric acid or phosphorous acid, e.g. trimethyl phosphate, triethyl phosphate, tributyl phosphate, triphenyl posphate, trimethyl phosphite, triethyl phosphite, tributyl phosphite, triphenyl phosphite, phenylmethyl phosphite and the like; with trimethyl phosphate, triethyl phosphate and tributyl phosphate being preferred, with tributyl phosphate being the most preferred.

Said electron-donor activator of component (A) according to the present invention, for example, is one or more organic alcohols including aliphatic alcohols or their corresponding isomer having 1 to 8 carbon atoms, for example, methanol, ethanol, propanol, isopropanol, butanol, isobutanol, 2-ethylhexanol, n-octanol and glycerol, with ethanol, butanol, 2-ethylhexanol and glycerol being the most preferred. Examples of said electron-donor activator also include organic ethers, such as lower aliphatic ether, for example, methyl ether, ethyl ether, propyl ether, butyl ether and amyl ether.

During the period of preparing the homogeneous solution of said magnesium halide of component A according to the present invention, a metal halide adjusting agent can be added into said solution and said metal halide is selected from a halide of Bi, Zn, Pb, Ca, Hg, V, Fe, Co and Sr or a mixture thereof. The addition of said metal halide component in the catalyst system according to the present invention results in a more effective hydrogen-regulator modification on the molecular weight of the polymer in ethylene polymerization or copolymerization as said catalyst system being used.

The amounts of various ingredients of component A according to the present invention, based on per mole of magnesium halide, are as follows: organic epoxy compounds, 0.01–10 mole, preferably 0.02–4 mole; organic phosphorus compounds, 0.01–10 mole, preferably 0.02–4 mole; electron-donor activator, 0.005–15 mole, preferably 0.05–10 mole; metal halide, 0–0.2 mole, preferably 0.02–0.08 mole; coprecipitator, 0.02–0.8 mole, preferably 0.03–0.5 mole; and transition metal titanium halides, 0.2–20 mole, preferably 1–15 mole.

2. Precipitation of the solids

The magnesium halide homogeneous solution obtained by the above-mentioned procedure is mixed with titanium compounds to form a solid precipitate in the presence of a coprecipitator with stirring for a period of time at an elevated temperature.

Said coprecipitator of component (A) according to the present invention include organic acids, organic anhydrides, ethers, ketones or a mixture thereof; such as acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, methyl ether, ethyl ether, propyl ether, butyl ether, amyl ether and the like. The organic anhydrides are preferred, with phthalic anhydride being the most preferred.

The process of solids precipitation can be carried out by one of two methods. One method involves adding titanium compound into the magnesium halide solution at a temperature in the range of about −35° C. to 60° C. in dropwise, and precipitating the solids while the temperature is raised slowly to a range of about 30° C.–120° C., preferably 60° C.–100° C. The other method involves adding the magnesium halide homogeneous solution in dropwise into the titanium compound under the same conditions as the above to precipitate out solids. In both methods, a coprecipitator must be present in the reaction system. The coprecipitator can be added either after the magnesium halide solution is obtained or together with magnesium halide in step 1. Alternatively, two or more coprecipitators can be added simultaneously.

In order to obtain uniform solid particles, the process of precipitation should be carried out slowly. When the method of adding titanium halide dropwise is applied, the process should preferably take place over a period of from about 10 minutes to 6 hours. When the method of rising the temperature in a slow manner is applied, the rate of temperature increase preferably ranges from about 4° C. to about 100° C. per hour.

The liquid titanium compound or its derivatives used in this step can be in the pure liquid state, or in a solution of inert diluents, having the general formula $TiX_n(OR)_{4-n}$, wherein X is a halogen, R is a hydrocarbyl group being identical or different, and n is an integer of from 0 to 4. Examples of the compounds are titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium and the like. Titanium tetrachloride is the most preferred.

The solid precipitate, after being separated from the mixture, is further washed with an inert diluent to remove ineffective titanium compounds and other impurities. The inert diluent herein used can be hexane, heptane, octane, 1,2-dichloroethane, benzene, toluene and other hydrocarbons.

Characteristics and chemical composition of the solid catalyst component (A)

Component (A) according to the present invention thus obtained through the above described steps, can be used as a solid or as a suspension.

The solid component (A) obtained according to this invention is in the form of powdered solid particles, with an average particle size of 2–25 microns, with a high specific surface area of more than 50 $M^2/g$, preferably more than 200 $M^2/g$. The particle size of component (A) can be controlled by alterating the preparing condition. The solid catalyst component (A) has the following chemical composition: titanium, 1.5–7.0 wt %; magnesium, 10–30 wt %; halogen, 30–75 wt %.

Component (B) is an organic aluminum compound, having the general formula $AlR_{n'}X_{3-n'}$, wherin R is hydrogen, or a hydrocarbyl group having 1–20 carbon atoms, preferably an alkyl, aralkyl or aromatic group and the like; X is halogen, preferably chlorine or bromine; and n' is an integer of $0<n'\leq3$. Examples of the compounds are trialkyl aluminums such as trimethyl aluminum, triethyl aluminum, triisobutyl aluminum, trioctyl aluminum; hydrogenated alkyl aluminums such as diethyl aluminum hydride, di-isobutyl aluminum hydride; halogenated alkyl aluminums such as diethyl aluminum chloride, di-isobutyl aluminum chloride, ethyl aluminum sesquichloride, ethyl aluminum dichloride; with triethyl aluminum and triisobutyl aluminum being preferred.

In the catalyst system according to the present invention, the molar ratio of Al of component B to Ti of component A is from 5 to 1000, preferably 100 to 800.

The process for preparing component A according to the present invention comprises the steps of:

(a) dissolving an electron-donor activator, and optionally, a metal halide adjusting agent, with continuously stirring into a solution of magnesium halide in a solvent system consisting essentially of organic epoxy compounds and organic phosphorus compounds to form a homogeneous solution;

(b) either adding in dropwise a titanium compound into said homogeneous solution or adding in dropwise said homogeneous solution into the titanium compound in the presence of a coprecipitator at a temperature of about −35–60° C., preferably −30–5° C., and then raise the temperature of the reaction mixture to 60–110° C. to form a suspension;

(c) stirring said suspension for 10 minutes to 10 hours;

(d) filtering out the precipitate formed from said suspensions, removing the mother liquid and washing the solid substance with toluene or hexane to obtain a titanium-containing solid catalyst component.

Component A and component B of the catalyst system according to the present invention can be used in polymerization system directly, or can also be used in a pre-complexed form.

The catalyst system according to the present invention is used in the homopolymerization of ethylene and can also be used in the copolymerization of ethylene with other oldfines. The suitable comonomer includes propylene, butene, pentene, hexene, octene, 4-methylpentene-1.

Liquid-phase polymerization and gas-phase polymerization can both be employed. An inert solvent selected from saturated aliphated or aromatic hydrocarbons such as hexane, heptane, cyclohexane, naphtha, extract oil, hydrogenated gaoline, kerosene, benzene, toluene and xylene can be used as the reaction medium in liquid-phase polymerization. Prepolymerization can be conducted before polymerization. Polymerization can be carried out in batch mode, semi-continuous or continuous mode.

The polymerization takes place at a temperature ranging from room temperature to about 150° C., preferably from about 50° C. to 100° C. Hydrogen gas can be used as a molecular weight regulator to regulate the molecular weight of the polymer.

To further illustrate this invention, and not by way of limitation, the following examples and comparative examples are given.

EXAMPLES

Example 1

1. Synthesis of catalyst

Anhydrous magnesium chloride (0.042 mol), toluene 60 ml, epoxy chloropropane (0.032 mol), tributyl phosphate (0.022 mol) and ethanol (0.017 mol) were introduced in turn into a reactor which had thoroughly been purged with highly purified nitrogen. The temperature was raised to 80° C. with stirring, and the mixture was then maintained at this temperature for 15 minutes, while the solids dissolved completely to form a homogeneous solution. Phthalic anhydride (0.0074 mol) was added to the solution, and then the solution was maintained for an additional 1 hour. The solution was cooled to −25° C. Titanium tetrachloride (0.5 mol) was added in dropwise, and then the temperature was raised slowly to 80° C., and the reaction was conducted for 3 hours. After filtration, the solid portion was washed six times with toluene and hexane, respectively. Finally, after vacuum drying, the solid catalyst was obtained.

2. Ethylene polymerization

Hexane (1000 ml), triethyl aluminum (2.5 mmol/L hexane) and the resultant solid catalyst component (2.4 mg (0.0025 mmol, based on titanium)) were introduced into a 2-liter stainless steel autoclave which had been thoroughly purged with nitrogen. The temperature was raised to 70° C. Ethylene was introduced into the autoclave and the pressure was maintained at 0.6 MPa (G). The polymerization was conducted at the temperature of 70° C. for 2 hours. The results of polymerization were shown in Table 1.

Example 2

1. Synthesis of catalyst

A catalyst was prepared in the same manner as in Example 1.

2. Ethylene polymerization

Hexane (1000 ml), triethyl aluminum (2.5 mmol/L hexane) and the resultant solid catalyst component (5.2 mg (0.00508 mmol, based on titanium)) were introduced into a 2-liter stainless steel autoclave which had been thoroughly purged with nitrogen. The temperature was raised to 75° C. Hydrogen was introduced into the autoclaves and the pressure was maintained at 0.25 MPa (G). After stop of adding hydrogen, ethylene was introduced into the autoclaves and the pressure was maintained at 1.0 MPa (G). The polymerization was conducted at the temperature of 80° C. for 2 hours. The results of polymerization were shown in Table 1. The granular appearance and granular distribution of the polymer particles were shown in Table 2.

Example 3

1. Synthesis of catalyst

Example 1 was followed except that the ethanol used in Example 1 was changed to a mixed alcohol, wherein ethanol was 0.054 mol, butanol was 0.03 mol.

2. Ethylene polymerization

The polymerization procedure described in Example 2 was followed. The results were shown in Table 1.

Comparative Example 1

1. Synthesis of catalyst

A catalyst was prepared in the same manner as in Example 1 disclosed in CN 85100997.2, which was as follows. Anhydrous magnesium chloride (0.05 mol), toluene (75 ml), epoxy chloropropane (0.1 mol) and tributyl phosphate (0.03 mol) were introduced into a reactor which had thoroughly been purged with high purified nitrogen. The temperature was raisd to 50° C. with stirring, and the mixture was then maintained at this temperature for 2 hours, while the solid was dissolved completely. Phthalic anhydride (0.008 mol) was added to the solution, and then the solution was maintained for additional 1 hour at 50° C. The solution was cooled to −25° C., titanium tetrachloride (55 ml) was added dropwise over the course of 1 hour. The solution was heated to 80° C. over the course of 3 hours, while solid product was precipitated. Diisobutyl Phthalate (0.0125 mol) was added at the temperature. The mixture was then maintained at the temperature for 1 hour. The solid portion was collected by filtration and washed with toluene (2×100 ml), brown-yellow solid precipitate was obtained. The solid was treated with the mixture of toluene (60 ml) and titanium tetrachloride (40 ml) for 2 hours at 90° C. After filtrate was removed, the treatment step was repeated. The solid was washed with dichloroethane (100 ml), and then washed with hexane (4×100 ml).

The solid catalyst component (A) was obtained by the above procedure. The solid catalyst component contained 1.92% by weight of titanium, 17.5% by weight of magnesium, 56.5% by weight of chlorine, 13.2% by weight of diisobutyl phthalate, 0.32% by weight of tributyl phosphate. The specific surface area of it is 290 m²/g.

2. Ethylene polymerization

The polymerization procedure described in Example 2 was followed. The results were shown in Table 1.

Comparative Example 2

1. Synthesis of catalyst

The process disclosed in the specification of JP 49-51378 was followed, which was as follows. Commercially available anhydrous magnesium chloride (10 mol) was suspended in hexane (10 L). Ethanol (60 mol) was added dropwise into the suspension at room temperature and was stirred for 30 minutes. AlEt$_2$Cl (31 mol) was added dropwise while the system being maintained at a temperature of not above 40° C. with stirring for another 30 minutes, TiCl$_4$ (5 mol) was added. The reaction was conducted at 60° C. for 6 hours with stirring. Precipitates were filtrated out and washed with hexane, and the catalyst was obtained.

2. Ethylene polymerization

The polymerization procedure described in Example 2 was followed. The results were shown in Table 1. The distribution of the polymer particle size was shown in Table 2.

TABLE 1

| | $P_{C=2}$ MPa | $P_{H_2}$ MPa | Activity of Catalyst kg/g cat | Apparent Density of Polymer g/ml | Melt Index of Polymer g/10 min |
| --- | --- | --- | --- | --- | --- |
| EX 1 | 0.6 | 0 | 103 | 0.34 | |
| EX 2 | 0.75 | 0.25 | 39.6 | 0.33 | 0.11 |
| EX 3 | 0.75 | 0.25 | 30.7 | 0.37 | 0.50 |
| Co. EX 1 | 0.75 | 0.25 | 7.1 | 0.34 | 0.08 |
| Co. EX 2 | 0.75 | 0.25 | 27.6 | 0.30 | 0.11 |

TABLE 2

| | Distribution of Polymer Particle Size | | | | | |
| --- | --- | --- | --- | --- | --- | --- |
| | <105 µm wt % | 105–180 µm wt % | 180–280 µm wt % | 280–450 µm wt % | 450–900 µm wt % | >900 µm wt % |
| EX 2 | 1.5 | 8.8 | 25.6 | 59.0 | 3.7 | 1.1 |
| Co. EX 2 | 9.2 | 16.4 | 14.3 | 16.4 | 22.5 | 21.5 |

From the data of Example 2, Example 3, Comparative Example 1 and Comparative Example 2 listed in Table 1, it is shown that the activity of the catalyst according to the present invention is relatively high. According to the data of Example 2 and Comparative Example 2 listed in Table 2, it is obvious that the ethylene polymer polymerized by using the catalyst of the present invention has more narrow particle size distribution and better particle morphology Example 4

1. Synthesis of catalyst

Example 1 was followed except that the ethanol used in Example 1 was changed to butanol (0.07 mol).

2. Ethylene polymerization

The polymerization procedure described in Example 1 was followed. The results were shown in Table 3.

Example 5

1. Synthesis of catalyst

Example 1 was followed except that the ethanol used in Example 1 was changed to methanol (0.16 mol).

2. Ethylene polymerization

The polymerization procedure described in Example 1 was followed. The results were shown in Table 3.

TABLE 3

|  | Alcohols | $P_{C=2}$ MPa | $P_{H_2}$ MPa | Activity of Catalyst kg/g cat | Apparent Density of Polymer g/ml |
|---|---|---|---|---|---|
| EX 1 | Ethanol | 0.6 | 0 | 103 | 0.34 |
| EX 4 | Butanol | 0.6 | 0 | 82.3 | 0.38 |
| EX 5 | Methanol | 0.6 | 0 | 22.0 | 0.27 |

Example 6

1. Synthesis of catalyst

Example 1 was followed except that the amount of ethanol added was changed from 0.017 mol (1 ml) to 0.051 mol (3 ml).

2. Ethylene polymerization

The polymerization procedure described in Example 1 was followed. The results were shown in Table 4.

Example 7

1. Synthesis of catalyst

Example 1 was followed except that the amount of ethanol added was changed from 0.017 mol (1 ml) to 0.102 mol (6 ml).

2. Ethylene polymerization

The polymerization procedure described in Example 1 was followed. The results were shown in Table 4.

Example 8

1. Synthesis of catalyst

Example 1 was followed except that the amount of ethanol aded was changed from 0.017 mol (1 ml) to 0.204 mol (12 ml).

2. Ethylene polymerization

The polymerization procedure described in Example 1 was followed. The results were shown in Table 4.

Example 9

1. Synthesis of catalyst

Example 1 was followed except that ethyl ether (1 ml) and ethanol (1 ml) were simultaneously added.

2. Ethylene polymerization

The polymerization procedure described in Example 1 was followed. The results were shown in Table 4.

Example 10

1. Synthesis of catalyst

Example 1 was followed except that the amount of epoxy compound added was changed to 0.07 mol, the amount of tributyl phosphate added was changed to 0.028 mol and ethanol was changed to ethyl ether (0.01 mol).

2. Ethylene polymerization the polymerization procedure described in Example 1 was followed. The results were shown in Table 4.

TABLE 4

|  | Amount of Alcohol and/or Ether | Activity of Catalyst kg/g cat | Apparent Density of Polymer g/ml |
|---|---|---|---|
| EX 1 | 0.017 mol | 103 | 0.34 |
| EX 6 | 0.051 mol | 60.5 | 0.33 |
| EX 7 | 0.102 mol | 26.0 | 0.33 |
| EX 8 | 0.204 mol | 47.0 | 0.30 |
| EX 9 | 0.017 mol + 0.01 mol ethyl ether | 15.0 | 0.30 |
| EX 10 | 0.01 mol ethyl ether | 17.0 | 0.30 |

Example 11

1. Synthesis of catalyst

Example 1 was followed except that znc chloride (0.5 g) was added druign the dissolution of magnesium chloride.

2. Ethylene polymerization

The polymerization procedure described in Example 1 was followed. The results were shown in Table 5.

Example 12

1. Synthesis of catalyst

Example 11 was followed.

2. Ethylene polymerization

The polymerization procedure described in Example 1 was followed except that the pressures of ethylene and hydrogen added were changed to 0.5 MPa, respectively. The results were shown in Table 5.

Example 13

1. Synthesis of catalyst

Example 11 was followed.

2. Ethylene polymerization

The polymerization procedure described in Example 1 was followed except that the pressures of ethylene and hydrogen added were changed to 0.2 MPa and 0.4 MPa, respectively. The results were shown in Table 5.

Example 14

1. Synthesis of catalyst

Example 1 was followed.

2. Ethylene polymerization

The polymerization procedure described in Example 1 was followed except that the pressures of ethylene and hydrogen added were changed to 0.5 MPa and 0.5 MPa, respectively. The result were shown in Table 5.

Example 15

1. Synthesis of catalyst

Example 1 was followed.

2. Ethylene polymerization

The polymerization procedure described in Example 1 was followed except that the pressures of ethylene and hydrogen added were changed to 0.2 MPa and 0.4 MPa, respectively. The results were shown in Table 5.

TABLE 5

| | Amount of ZnCl$_2$ Added | P$_{C=2}$ MPa | P$_{H_2}$ MPa | Melt Index of Polymer g/10 min | Apparent Density of Polymer g/l |
|---|---|---|---|---|---|
| EX 11 | 0.5 g | 0.75 | 0.25 | 0.14 | 0.34 |
| EX 12 | 0.5 g | 0.5 | 0.5 | 2.19 | 0.38 |
| EX 13 | 0.5 g | 0.2 | 0.4 | 7.76 | 0.27 |
| EX 2 | 0 | 0.75 | 0.25 | 0.11 | |
| EX 14 | 0 | 0.5 | 0.5 | 2.14 | |
| EX 15 | 0 | 0.2 | 0.4 | 6.47 | |
| Co. EX 1 | 0 | 0.75 | 0.25 | 0.08 | |
| Co. EX 1* | 0 | 0.5 | 0.5 | 1.8 | |

*note: Comparative Example 1 was followed except that the listed parameters are used.

From the results listed in Table 5, it is shown that when the matal halide was used in the ethylene polymerization of the present invention, the present catalysts exhibited better modification effect on molecular weight of the polymer as using hydrogen as a regulator. And it can also be seen that in polymerization of ethylene, as compared with the catalyst described in CN 85100997.2, the catalyst according to the present invention exhibited a higher sensitivity to hydrogen regulator.

Example 16

1. Synthesis of catalyst

Example 1 was followed.

2. Ethylene copolymerization

Hexane (300 ml) and hexene-1 (44 ml) were added into a glass flask. Then triethyl aluminum (7.4 ml) and the resultant solid catalyst component (14.7 mg (0.01467 mmol, based on titanium) were added with stirring. The mixture was heated to 55° C. And then ethylene was introduced into the flask to reach a pressure of 0.04 MPa and the polymerization was conducted at 55° C. for 2 hours. The results were shown in Table 6.

Example 17

1. Synthesis of catalyst

Example 1 was followed.

2. Ethylene copolymerization

Hexane (1000 ml), triethyl aluminum 2.5 mmol/L hexane, hexene (30 ml) and the solid catalyst component obtained in Example 1 (5.2 mg (0.00508 mmol, based on titanium)) were introduced into a 2-liter stainless steel autoclave which had been thoroughly purged with nitrogen. The mixture was heated to 65° C. And then hydrogen was introduced into the autoclave to reach a pressure of 0.1 MPa (G). After stop of adding hydrogen, ethylene was introduced into the autoclave to reach a pressure of 0.5 MPa (G). The polymerization was conducted at 70° C. for 2 hours. The results were shown in Table 6.

Comparative Example 3

1. Synthesis of catalyst

Comparative Example 2 was followed.

2. Ethylene copolymerization

The copolymerization procedure described in Example 17 was followed. The results were shown in Table 6.

TABLE 6

| | P$_{C=2}$ MPa | P$_{H_2}$ MPa | Hexene ml | Degree of Branching CH$_3$/1000 C. | Density of Polymer g/cm$^3$ |
|---|---|---|---|---|---|
| EX 16 | 0.04 | 0 | 44 | 16.9 | 0.908 |
| EX 17 | 0.4 | 0.1 | 30 | 4.9 | 0.923 |
| Co. EX 3 | 0.4 | 0.1 | 30 | 2.7 | 0.944 |

In comparison with the prior art, the catalyst system according to the present invention for ethylene polymerization and copolymerization has significant advantages as follows.

1. In comparison with titanium-containing solid catalyst component (A) disclosed in CN 85100997.2, titanium-containing solid catalyst component (A) of the present invention comprises a electron-donor activator such as organic alcohols, organic ethers, and the like. Therefore, when used in the ethylene polymerization, the catalyst system of the present invention exhibits very high activity. It is obvious from the data below:

a. Under the conditions of hydrogen pressure (0.25 MPa), ethylene pressure (0.75 MPa), at the temperature 80° C., during two hours ethylene polymerization, the polymerization activity of the catalyst system is as high as 39.6 kg PE/g cat.

b. As disclosed in Example 24 of CN 85100997.2, under the conditions of hydrogen pressure (0.25 MPa), ethylene pressure (0.75 MPa), at the temperature 85° C., during two hours ethylene polymerization, the polymerization activity of the catalyst is 537 kg PE/g Ti (about 10.7 kg PE/g cat). The catalyst prepared in the same manner as described in Example 1 of CN 85100997.2 was used to conduct ethylene polymerization for two hours under the conditions of hydrogen pressure (0.25 MPa), ethylene pressure (0.75 MPa), at the temperature 80° C., the polymerization activity of the catalyst was 7.1 kg PE/g cat.

2. The content of titanium in per gram catalyst of the present invention is 4–7%, while the content of titanium in the catalyst of CN 85100997.2 is only about 2%. Therefore, the availability of the active ingredients of the present invention is improved and the cost of the catalyst is lowered.

3. During the preparation of the catalyst system according to the present invention, the catalyst particles were formed by dissolution and precipitation, whereby the resultant catalyst particles exhibit a uniform particle fineness. Therefore, when the catalyst is used in the ethylene polymerization, the resutlant polymer particles exhibit better particle morphology and higher apparent density, and generally, the apparent density is 0.33–0.39 g/ml. The apparent density of the polymer particles can be increased by more than 15% higher than JP 49-51378, and the particle size distribution of polymer is relatively narrow. In comparison with JP 49-51378, the content of polymer particules having 180–450 μm is changed from 30.7 wt % to 84 wt %.

4. During the preparation of the catalyst system, it is unnecessary to active the system with a titanium compound as described in CN 95100997.2 after the solid particles of the catalyst being formed, whereby the synthesis procedure of the present catalyst can be simplyfied remarkably, the amount of titanium compound can also be decreased to a great extent, the pollution can be decreased and the cost of catalyst can also be lowered remarkably.

What is claimed is:

1. A catalyst system for use in ethylene polymerization or copolymerization, comprising:
   (a) a titanium containing solid catalyst component; and
   (b) an organic aluminum compound,
wherein the molar ratio of aluminum in component b) to titanium in component a) is from 5 to 1,000, and wherein the titanium containing solid catalyst component is produced by a process consisting essentially of:
   providing a solution of magnesium halide in a solvent composition comprising organic epoxy compounds and organic phosphorous compounds;
   dissolving an alcohol electron-donor activator in the solution to form a homogeneous solution;
   adding a co-precipitator into the homogeneous solution, followed by:
      adding a titanium compound selected from the group having general formula $TiX_n(OR)_{4-n}$, wherein X is a halogen, R is a hydrocarbyl group, and n is from 0 to 4, to form a precipitate; and
      washing the precipitate;
wherein the co-precipitator is selected from the group consisting of organic acids, organic anhydrides, ethers, ketones, and mixtures thereof.

2. A catalyst system as claimed in claim 1 wherein a metal halide adjusting agent is added to the magnesium halide solution during the formation of said solution, and said metal halide is selected from the group consisting of halides of Bi, Zn, Pb, Ca, Hg, V, Fe, Co, Sr and mixtures thereof.

3. A catalyst system as claimed in claim 1 wherein said magnesium halide is selected from the group consisting of magnesium dihalides, complexes of magnesium dihalides with water or alcohol, derivatives of magnesium dihalides wherein a halogen atom is substituted by a hydrocarboxyl group or a halohydrocarboxyl group, and mixtures thereof.

4. A catalyst system as claimed in claim 1 wherein said organic epoxy compound is selected from the group consisting of ethylene oxide, propylene oxide, butylene oxide, butadiene oxide, butadiene dioxide, epoxy chloropropane, and mixtures thereof.

5. A catalyst system as claimed in claim 1, wherein said organic phosphorous compound is selected from the group consisting of trimethyl phosphate, triethyl phosphate, tributyl phosphate, triphenyl phosphate, trimethyl phosphite, triethyl phosphite, tributyl phosphite, triphenyl phosphite and mixtures thereof.

6. A catalyst system as claimed in claim 1 wherein said electron-donor activator comprises one or more alcohols selected from the group consisting of $C_1$–$C_8$ aliphatic alcohols and their corresponding isomers.

7. A catalyst system as claimed in claim 1, wherein said alcohol electron-donor is added in an amount of 0.4 to 4.86 mol/mol magnesium halide and the molar ratio of alcohol/organic epoxy compound is from 0.53 to 6.4.

8. A catalyst system as claimed in claim 1 wherein said electron-donor activator comprises one or more organic alcohols selected from the group consisting of methanol, ethanol, propanol, isopropanol, butanol, isobutanol, 2-ethylhexanol, n-octanol, and glycerol.

9. A catalyst system as claimed in claim 1 wherein said coprecipitator is selected from the group consisting of acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, methyl ether, ethyl ether, propyl ether, butyl ether, amyl ether and mixtures thereof.

10. A catalyst system as claimed in claim 1 wherein the titanium compound is selected from the group consisting of titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium, and mixtures thereof.

11. A catalyst system as claimed in claim 1, wherein the molar ratio of magnesium halide to said electron-donor activator in component (a) is 1:0.005–15.

12. A catalyst system as claimed in claim 1, wherein the molar ratio of magnesium halide to titanium compound in component (a) is 1:0.2–20.

13. A catalyst system as claimed in claim 1 wherein said alcohol electron-donor is added in an amount of 0.05 to 10 mol/mol magnesium halide and the molar ratio of alcohol/organic epoxy compound is from 0.53 to 6.4.

14. A process for preparing the catalyst system of claim 1, comprising the steps of:
   (a) dissolving the alcohol electron donor activator with continuous stirring into a solution of magnesium halide in a solvent composition comprising an organic epoxy compound and an organic phosphorous compound to form a homogeneous solution;
   (b) either adding dropwise the titanium compound to the homogeneous solution or adding dropwise the homogeneous solution to the titanium compound in the presence of one or more of the co-precipitators at a temperature of about −35–60° C.;
   (c) increasing the temperature of the reaction mixture to 60–110° C. to form a suspension of the precipitate;
   (d) stirring said suspension for ten minutes to ten hours;
   (e) filtering out the precipitate; and
   (f) washing the precipitate with toluene and hexane to obtain the titanium containing solid catalyst.

15. A catalyst system for use in ethylene polymerization or copolymerization comprising:
   (a) a titanium containing solid catalyst component; and
   (b) an organic aluminum compound,
wherein the molar ratio of aluminum in component b) to titanium in component a) is from 5 to 1,000, and wherein the titanium containing solid catalyst component is produced by a process consisting essentially of:
   dissolving a magnesium halide, a co-precipitator, and an alcohol electron donor activator in a solvent composition comprising organic epoxy compounds and organic phosphorous compounds to form a magnesium halide solution; and
   adding a titanium compound selected from the group having general formula $TiX_n(OR)_{4-n}$, wherein X is a halogen, R is a hydrocarbyl group, and n is from 0 to 4, to form a precipitate; and
   washing the precipitate,
wherein the co-precipitator is selected from the group consisting of organic acids, organic anhydrides, ketones, and mixtures thereof.

16. A catalyst system as claimed in claim 15, wherein said alcohol electron-donor is added in an amount of 0.4 to 4.86 mol/mol magnesium halide and the molar ratio of alcohol/organic epoxy compound is from 0.53 to 6.4.

17. A catalyst system as claimed in claim 15, wherein said alcohol electron-donor is added in an amount of 0.05 to 10 mol/mol magnesium halide and the molar ratio of alcohol/organic epoxy compound is from 0.53 to 6.4.

18. A catalyst system as claimed in claim 15, wherein the molar ratio of magnesium halide to titanium compound in component (a) is 1:0.2–20.

19. A catalyst system as claimed in claim 15, wherein the molar ratio of magnesium halide to the electron-donor activator in component (a) is 1:0.005–15.

20. A catalyst system as claimed in claim 15, wherein a metal halide adjusting agent is added to the magnesium halide solution during the formation of the solution, and the metal halide adjusting agent is selected from the group consisting of halides of Bi, Zn, Pb, Ca, Hg, V, Fe, Co, Sr and mixtures thereof.

21. A catalyst system as claimed in claim 15, wherein the magnesium halide is selected from the group consisting of magnesium dihalides, complexes of magnesium dihalides with water or alcohols, derivatives of magnesium dihalides wherein a halogen atom is substituted by a hydrocarboxyl group or a halohydrocarboxyl group, and mixtures thereof.

22. A catalyst system as claimed in claim 15, wherein the organic epoxy compound is selected from the group consisting of ethylene oxide, propylene oxide, butylene oxide, butadiene oxide, butadiene dioxide, epoxy chloropropane, and mixtures thereof.

23. A catalyst system as claimed in claim 15, wherein the organic phosphorous compound is selected from the group consisting of trimethyl phosphate, triethyl phosphate, tributyl phosphate, triphenyl phosphate, trimethyl phosphite, triethyl phosphite, tributyl phosphite, triphenyl phosphite, and mixtures thereof.

24. A catalyst system as claimed in claim 15, wherein the electron-donor activator comprises one or more alcohols selected from the group consisting of $C_1$–$C_8$ aliphatic alcohols and their corresponding isomers.

25. A catalyst system as claimed in claim 15, wherein the titanium compound is selected from the group consisting of titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium, and mixtures thereof.

26. A catalyst system as claimed in claim 15, wherein said electron-donor activator comprises one or more organic alcohols selected from the group consisting of methanol, ethanol, propanol, isopropanol, butanol, isobutanol, 2-ethylhexanol, n-octanol, and glycerol.

27. A catalyst system as claimed in claim 15, wherein the co-precipitator is selected from the group consisting of acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, and mixtures thereof.

28. A catalyst system for use in ethylene polymerization or copolymerization, comprising:

(a) a titanium containing solid catalyst component; and (b) an organic aluminum compound, wherein the molar ratio of aluminum in component b) to titanium in component a) is from 5 to 1,000, and wherein the titanium containing solid catalyst component is produced by a process consisting essentially of:

providing a solution of magnesium halide in a solvent composition comprising at least one organic compound selected from the group consisting of methylglycidyl ether, diglycidyl ether, tetrahydrofuran, and organic phosphorous compounds;

dissolving an alcohol electron-donor activator in the solution to form a homogeneous solution;

adding a co-precipitator into the homogeneous solution, followed by:

adding a titanium compound having general formula $TiX_n(OR)_{4-n}$, wherein X is a halogen, R is a hydrocarbyl group, and n is from 0 to 4, to form a precipitate; and washing the precipitate, wherein the co-precipitator is selected from the group consisting of organic acids, organic anhydrides, ethers, ketones, and mixtures thereof.

29. A catalyst system for use in ethylene polymerization or copolymerization, comprising:

(a) a titanium containing solid catalyst component; and (b) an organic aluminum compound, wherein the molar ratio of aluminum in component b) to titanium in component a) is from 5 to 1,000, and wherein the titanium containing solid catalyst component is produced by a process consisting essentially of:

dissolving a magnesium halide, a co-precipitator, and an alcohol electron donor activator in a solvent composition comprising at least one organic compound selected from the group consisting of methylglycidyl ether, diglycidyl ether, tetrahydrofuran, and organic phosphorous compounds to form a magnesium halide solution; and adding a titanium compound having general formula $TiX_n(OR)_{4-n}$, wherein X is a halogen, R is a hydrocarbyl group, and n is from 0 to 4, to form a precipitate; and washing the precipitate, wherein the co-precipitator is selected from the group consisting of organic acids, organic anhydrides, ethers, ketones, and mixtures thereof.

* * * * *